United States Patent
Weiler et al.

(10) Patent No.: US 10,688,967 B2
(45) Date of Patent: Jun. 23, 2020

(54) FIN RAY WIPER HAVING A CLAMPING DEVICE

(71) Applicant: Robert Bosch GmbH, Stuttgart (DE)

(72) Inventors: Michael Weiler, Buehl (DE); Peter Deak, Budapest (HU); Stephan Mayer, Achern (DE); Ulrich Metz, Achern (DE); Viktor Hackl, Sopron (HU)

(73) Assignee: Robert Bosch GmbH, Stuttgart (DE)

( * ) Notice: Subject to any disclaimer, the term of this patent is extended or adjusted under 35 U.S.C. 154(b) by 165 days.

(21) Appl. No.: 15/501,900

(22) PCT Filed: Jul. 29, 2015

(86) PCT No.: PCT/EP2015/067375
§ 371 (c)(1),
(2) Date: Feb. 6, 2017

(87) PCT Pub. No.: WO2016/020241
PCT Pub. Date: Feb. 11, 2016

(65) Prior Publication Data
US 2017/0225653 A1 Aug. 10, 2017

(30) Foreign Application Priority Data
Aug. 7, 2014 (DE) .................. 10 2014 215 686

(51) Int. Cl.
*B60S 1/04* (2006.01)
*B60S 1/34* (2006.01)
(Continued)

(52) U.S. Cl.
CPC . *B60S 1/04* (2013.01); *B60S 1/00* (2013.01); *B60S 1/345* (2013.01); *B60S 1/3436* (2013.01);
(Continued)

(58) Field of Classification Search
CPC .......... B60S 1/3459; B60S 1/34; B60S 1/342; B60S 1/3461; B60S 1/3436; B60S 1/3443;
(Continued)

(56) References Cited

U.S. PATENT DOCUMENTS 1,952,866 A * 3/1934 Hueber ..................... B60S 1/34
15/250.34
2,365,251 A * 12/1944 Curtiss ..................... B60S 1/34
15/250.34
(Continued)

FOREIGN PATENT DOCUMENTS

CN 1942350 A 4/2007
CN 102036862 A 4/2011
(Continued)

OTHER PUBLICATIONS

Machine translation of description portion of French publication 2927292, published Aug. 2009.*
(Continued)

*Primary Examiner* — Gary K. Graham
(74) *Attorney, Agent, or Firm* — Michael Best & Friedrich LLP

(57) ABSTRACT

The invention relates to a windshield wiper device for a vehicle, in particular a motor vehicle, having a fastening element fastened to a drive shaft. The windshield wiper device comprises a wiper blade having an elongate upper part, which is at least partially flexible, an elongated lower part, which is at least partially flexible, and a plurality of connecting elements for connecting the upper part and the lower part. Along a longitudinal extension of the wiper blade, the connecting elements are spaced apart from one another, wherein the connecting elements are designed to allow a movement of the upper part and the lower part relative to one another, by means of a movement component,
(Continued)

along a longitudinal extension of the wiper blade. The windshield wiper device further comprises a fastening part on the wiper blade side, wherein the fastening part on the wiper blade side comprises a clamping device such that the fastening part on the wiper blade side can be adjusted to the dimension of at least part of the drive shaft.

19 Claims, 7 Drawing Sheets

(51) Int. Cl.
*B60S 1/38* (2006.01)
*B60S 1/00* (2006.01)
(52) U.S. Cl.
CPC .......... *B60S 1/3443* (2013.01); *B60S 1/3459* (2013.01); *B60S 1/3801* (2013.01); *B60S 1/3427* (2013.01); *B60S 2001/3812* (2013.01)
(58) Field of Classification Search
CPC ...... B60S 1/3454; B60S 1/3452; B60S 1/345; B60S 1/38; B60S 1/3427; B60S 1/3801
USPC ....................................................... 15/250.34
See application file for complete search history.

(56) References Cited

U.S. PATENT DOCUMENTS

| | | | | |
|---|---|---|---|---|
| 2,964,775 A * | 12/1960 | Krohm | ...................... | B60S 1/34 15/250.34 |
| 3,041,093 A * | 6/1962 | Bonfiglio | .................. | B60S 1/34 403/9 |
| 3,048,430 A * | 8/1962 | Reese | ...................... | B60S 1/34 403/321 |
| 3,058,143 A * | 10/1962 | Bock | ......................... | B60S 1/34 15/250.34 |
| 3,711,890 A * | 1/1973 | Kolb | ..................... | B60S 1/3459 15/250.34 |
| 3,716,888 A | 2/1973 | Riester | | |
| 4,566,146 A * | 1/1986 | Harbison | .............. | B60S 1/3459 15/250.34 |
| 2009/0025171 A1 * | 1/2009 | Cerdan | ..................... | B60S 1/32 15/250.31 |
| 2016/0159322 A1 * | 6/2016 | Weiler | .................. | B60S 1/3411 15/250.32 |

FOREIGN PATENT DOCUMENTS

| | | | |
|---|---|---|---|
| DE | 102005060865 | | 6/2007 |
| DE | 102012201287 | | 8/2013 |
| DE | 102013214064 | | 5/2014 |
| EP | 1803619 | A2 | 7/2007 |
| ES | 2361434 | A1 | 6/2011 |
| FR | 1028717 | * | 5/1953 |
| FR | 2890922 | * | 3/2007 |
| FR | 2927292 | * | 8/2009 |
| GB | 487027 | A | 6/1938 |
| GB | 1425568 | A | 2/1976 |
| JP | 2010-83262 | * | 4/2010 |
| KR | 100821979 | B1 | 4/2008 |

OTHER PUBLICATIONS

Machine translation of description portion of Japanese publication 2010083262, published Apr. 2010. (Year: 2010).*
International Search Report for Application No. PCT/EP2015/067375 dated Oct. 15, 2015 (English Translation, 2 pages).

* cited by examiner

FIN RAY WIPER HAVING A CLAMPING DEVICE

BACKGROUND OF THE INVENTION

The invention relates to a windshield wiper device for a vehicle, in particular a motor vehicle.

Windshield wiper devices typically have a wiper arm or wiper lever, wherein a wiper blade is moved over the windshield of a motor vehicle. The wiper blade is moved here between a first turning position and a second turning position. For this purpose, the wiper arm or the wiper blade is connected via the drive shaft to a wiper motor. In particular on windshields having pronounced changes in curvature and in the event of great temperature fluctuations, the wiper blade easily loses contact with the windshield. This may result, in particular in the case of windshields having a pronounced curvature, in wiping areas not being wiped or in smearing.

Since a wiping operation has to be optimized for a multiplicity of parameters, such as, for example, the amount of rain falling on the windshield, a possible snow loading occurring on the windshield, the speed of the vehicle and associated wind pressure on the wiper arm, smearing cannot be reliably prevented in a simple manner by adaptation of the pressure of the wiper arm on the windshield. There is therefore a need for further improvement of windshield wiper devices.

There are a plurality of boundary conditions which should additionally be taken into consideration for improvement purposes. There is also a need here to ensure or improve the handling or the user friendliness.

SUMMARY OF THE INVENTION

It is the object of the present invention to provide a reliable and substantially smear-free wiping on the windshield of a vehicle, and/or to provide an improved windshield wiper device having simple handling, in particular simple mounting or removal.

According to an embodiment, a windshield wiper device for a vehicle with a drive shaft, in particular a motor vehicle, is provided. The windshield wiper device includes a wiper blade with an elongate upper part, which is configured to be at least partially bendable, an elongate lower part, which is configured to be at least partially bendable, a plurality of connecting elements for connecting the upper part and the lower part, wherein the connecting elements are spaced apart from one another along a longitudinal extent of the wiper blade, and wherein the connecting elements are designed in order to permit a movement of the upper part and of the lower part relative to each other with a movement component along a longitudinal extent of the wiper blade, and a wiper-blade-side fastening part, wherein the wiper-blade-side fastening part comprises a clamping device, and therefore the wiper-blade-side fastening part can be adapted to the size of at least one part of the drive shaft.

According to a further embodiment, a method for mounting a windshield wiper device is provided. The method includes providing a windshield wiper device, in particular as claimed in one of the embodiments described here, pushing the wiper-blade-side fastening part onto the drive shaft, wherein a gap is provided between the wiper-blade-side fastening part and the drive shaft; and clamping the fastening part to the drive shaft with the clamping device in order to form a force-fitting connection and/or form-fitting connection between the wiper-blade-side fastening part and the drive shaft.

Preferred embodiments and particular aspects of the invention emerge from the dependent claims, the drawings and the description here.

According to the embodiments of the invention that are described here, windshield wiper devices for vehicles can be mounted in a particularly favorable manner and for a plurality of different fields of use in a simple manner and with improved boundary conditions. Furthermore, the embodiments of the invention permit a reliable and substantially smear-free wiping of a windshield of a vehicle.

According to an embodiment, a windshield wiper device for a vehicle with a drive shaft, in particular a motor vehicle, is provided. The windshield wiper device includes a wiper blade with an elongate upper part, which is configured to be at least partially bendable, an elongate lower part, which is configured to be at least partially bendable, a plurality of connecting elements for connecting the upper part and the lower part, wherein the connecting elements are spaced apart from one another along a longitudinal extent of the wiper blade, and wherein the connecting elements are designed in order to permit a movement of the upper part and of the lower part relative to each other with a movement component along a longitudinal extent of the wiper blade, and a wiper-blade-side fastening part, wherein the wiper-blade-side fastening part comprises a clamping device, and therefore the wiper-blade-side fastening part can be adapted to the size of at least one part of the drive shaft. By this means, tilting can be prevented during the mounting.

According to a further preferred embodiment, the wiper-blade-side fastening part can include a cavity which, in a first position of the clamping device, has a larger cavity size than the at least one part of the drive shaft. By this means, the windshield wiper device can be pushed without tilting onto the drive shaft. According to a further preferred embodiment, the clamping device can be movable into a second position in which a force-fitting connection and/or form-fitting connection can be releasably produced with the drive shaft. By this means, after being placed on or pushed on without tilting, the windshield wiper device can be securely clamped to the spindle.

According to a further preferred embodiment, the clamping device can have a lever, in particular a toggle lever. By this means, a force-fitting connection and/or form-fitting connection with sufficient transmission of a torque for wiping purposes can be provided.

According to a further preferred embodiment, the clamping device can be configured such that the wiper blade provides a lever action for the clamping device. By this means, a force-fitting connection and/or form-fitting connection with sufficient transmission of a torque for wiping purposes can be provided.

According to a further preferred embodiment, the wiper-blade-side fastening part can be formed in one piece or with components fastened to the head end of the wiper blade. By this means, the windshield wiper device can be mounted without a tool, or the windshield wiper device is a single assembly which provides its dedicated tool in the form of a clamping device. In particular, the wiper-blade-side fastening part can be adapted in order to be provided by means of an injection molding process, in particular an injection molding process with one step. Furthermore, the clamping device can be connected to the wiper blade with a connecting joint, in particular a film hinge.

According to a further preferred embodiment, the cavity can have a cylindrical portion which has a larger inside diameter than a corresponding outside diameter of the at least one part of the drive shaft. By this means, tilting can be prevented during the mounting.

According to a further preferred embodiment, the plurality of connecting elements can be connected at a plurality of upper connecting positions to the upper part and at a plurality of lower corresponding connecting positions to the lower part, wherein, when the upper part and the lower part move relative to each other, the distance between an upper connecting position and a corresponding lower connecting position is substantially constant, in particular is constant with a deviation of ±1 mm. By this means, a force transmission between the upper part and the lower part can be provided, said force transmission making a windshield wiper device possible which operates in accordance with the Finray principle.

According to a further embodiment, a method for mounting a windshield wiper device is provided. The method includes providing a windshield wiper device, in particular as claimed in one of the embodiments described here, pushing the wiper-blade-side fastening part onto the drive shaft, wherein a gap is provided between the wiper-blade-side fastening part and the drive shaft; and clamping the fastening part to the drive shaft with the clamping device in order to form a force-fitting connection and/or form-fitting connection between the wiper-blade-side fastening part and the drive shaft. By this means, after being placed on or pushed on without tilting, the windshield wiper device can be securely clamped to the spindle.

BRIEF DESCRIPTION OF THE DRAWINGS

Exemplary embodiments of the invention are illustrated in the figures and are described in more detail below. In the figures.

DETAILED DESCRIPTION

Unless noted otherwise, the same reference numbers are used for identical and identically acting elements.

Figure 1:
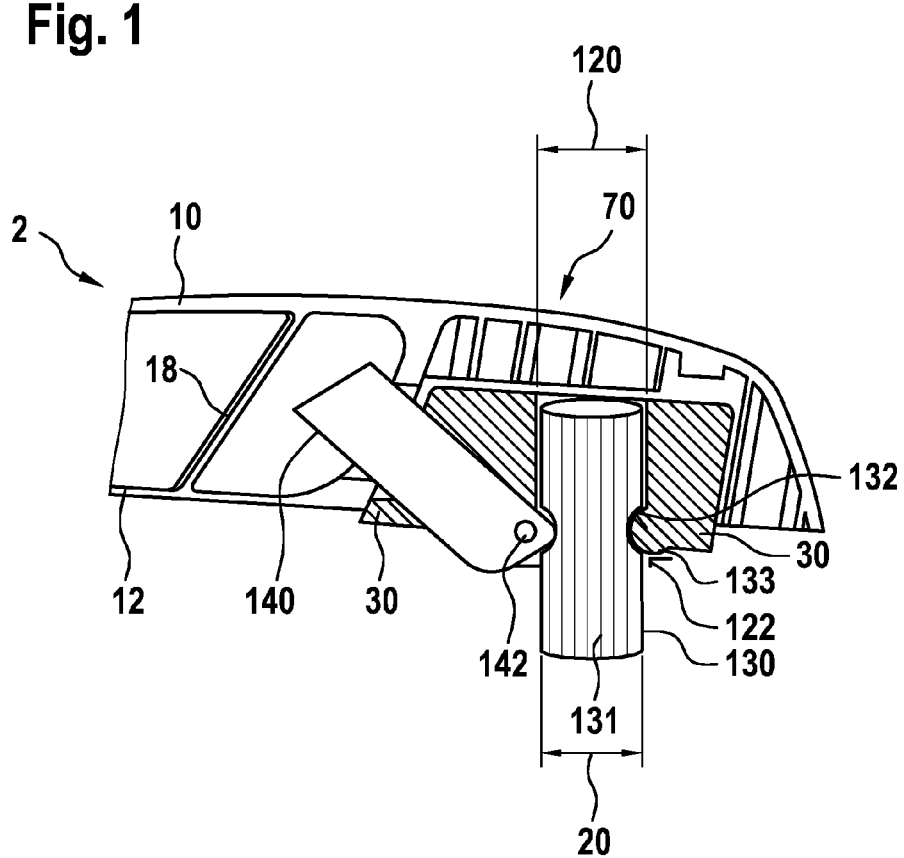
FIG. 1 shows a schematic illustration of a part of a wiper blade in a longitudinal sectional view with a clamping device according to embodiments of the invention.

FIG. 1 shows a schematic illustration of a cutout of a wiper blade 2 of a windshield wiper device for a vehicle, in particular for a motor vehicle. The wiper blade 2 comprises an elongate upper part 10 and an elongate lower part 12, which are configured to be at least partially bendable. Furthermore, a plurality of connecting elements 18 are provided for connecting the upper part 10 and the lower part 12, wherein the connecting elements 18 are spaced apart from one another along a longitudinal extent 8 of the wiper blade 2. FIG. 1, the cutout of the wiper blade 2, shows just one connecting element 18. The connecting elements 18 are designed in order to permit a movement of the upper part 10 and of the lower part 12 relative to each other with a movement component along a longitudinal extent of the wiper blade 2. According to additional or alternative refinements, the interaction of the upper part, the lower part and the connecting elements 18 may also be described by rotary joints at the respective ends of a connecting element, by which the connecting element is connected to the lower part and/or to the upper part. The connecting elements are connected to the upper part 10 at a respective upper connecting position and to the lower part 12 at a respective lower connecting position.

For example, a rotary joint is provided at each of the connecting positions. When the upper part 10 and lower part 12 move relative to each other, the distance of an upper connecting position to a lower connecting position on the same connecting element substantially does not change, i.e. the distance is constant with deviations of, for example, ±1 mm, in particular ±0.3 mm.

Furthermore, the wiper blade 2 has a head end 70. A fastening part, i.e. a wiper-blade-side fastening part, is provided at the head end. Along the longitudinal extent of the wiper blade 2, the distance between the upper part 10 and the lower part 12, starting from the head end, becomes smaller, at least in regions of the longitudinal extent of the wiper blade or in a predominant part of the longitudinal extent of the wiper blade. Starting from the head end, the height of the wiper blade converges in a wedge-shaped manner in regions or becomes smaller in regions of the longitudinal extent. For example, according to embodiments for a plurality of the connecting elements, the length of the connecting elements can be provided in such a manner that the connecting elements provided at the head end are longer than those on the opposite side of the wiper blade along the longitudinal extent.

By means of these properties, a wiper blade can be provided which operates according to the Finray principle. These windshield wiper devices typically do not have a joint in order to lift the wiper blade or a wiper lip from a windshield, for example a windshield of a motor vehicle. For example, the wiper blade 2 is fastened to the drive shaft by means of the clamping devices described here.

The absence of a joint in order to lift the wiper blade or a wiper lip from a windshield, for example a windshield of a motor vehicle, may cause the wiper-blade-side fastening part to tilt on the drive shaft when the wiper blade is brought up to the drive shaft. This can be prevented according to the embodiments described here.

FIG. 1A shows the wiper-blade-side fastening part 30. The fastening part has a cavity. The cavity has an inside diameter 120. The inside diameter 120 is larger than the outside diameter 20 of the drive shaft 130 or a part of the drive shaft 130 that is inserted into the cavity for mounting purposes. There is a gap 122 between the drive shaft and the wiper-blade-side fastening part 30. For the attaching of the wiper blade 2 or for the releasing of the wiper blade, a translatory movement takes place which can be oriented, for example, substantially along the axis of the drive shaft 130. The gap makes it possible to prevent tilting. Actuation of the clamping device 140 makes it possible to provide a force-fitting connection and/or form-fitting connection between the wiper-blade-side fastening part 30 and the drive shaft.

According to some embodiments, the clamping device can be a lever, in particular a toggle lever. This is illustrated, for example, in FIG. 1. The lever or toggle lever can be rotated about the axis 142, as a result of which the wiper blade is firmly clamped on the drive shaft 130 by means of a movement from a first position of the clamping device into a second position of the clamping device. According to some embodiments, knurls 131 can be provided on the drive shaft 130 in order to be able to transmit a greater torque.

FIG. 1 furthermore shows a bulge 133 on the wiper-blade-side fastening part 30. The bulge can engage in a groove 132 in the drive shaft. By this means, when the windshield wiper device is mounted on the drive shaft, simplified positioning can be provided along the axial direction of the shaft.

Figure 2A:
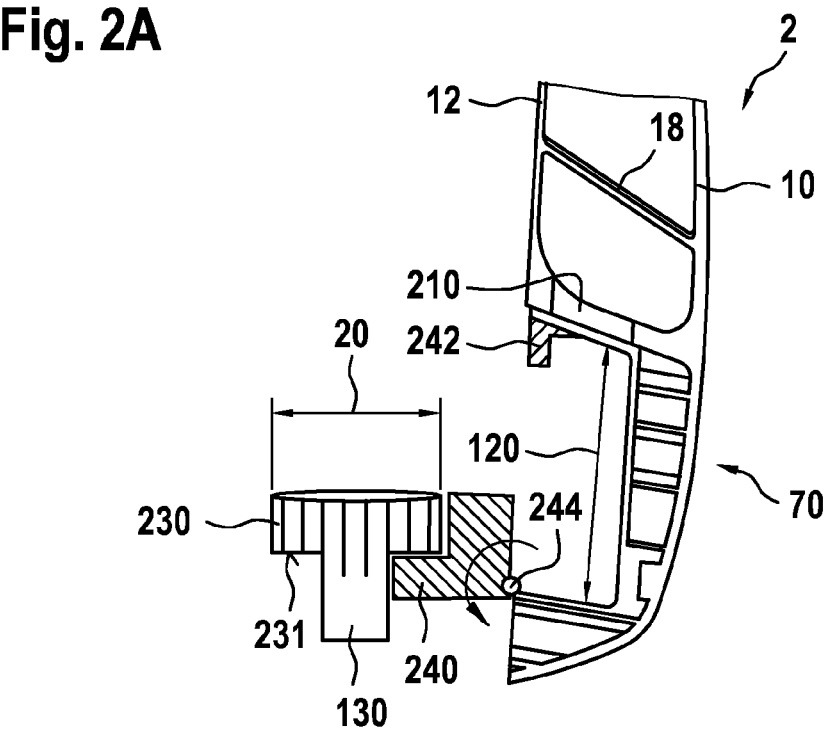
FIGS. 2A and 2B show a schematic illustration of a wiper blade with a clamping device according to embodiments of the invention in a first position, i.e. an open position, and a second position, i.e. a closed position.
Figure 2B:
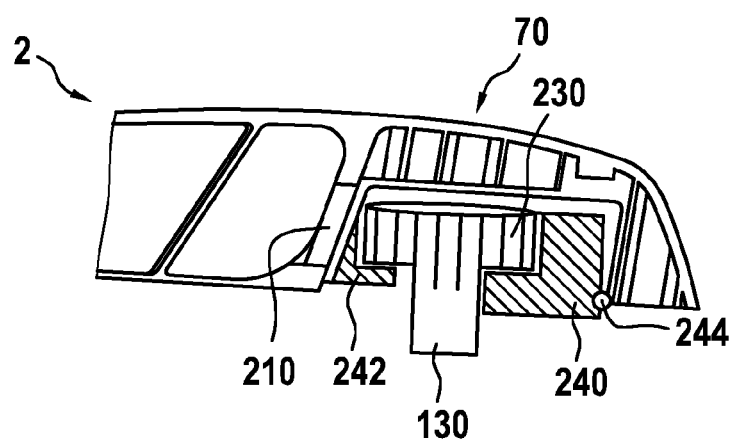

FIGS. 2A and 2B show a further form of a clamping device which can be provided according to embodiments described here. In particular, such embodiments can be used for a driven shaft 130 having a widened head end 230, for example for a knurled cup.

FIG. 2A shows the wiper blade during the mounting, wherein the clamping device is in an open first position. The wiper blade 2 is pushed onto the drive shaft, and therefore the clamping device 240 lies against the widened head end of the drive shaft, i.e. against a part of the drive shaft 130. The clamping device can be a clamping jaw which is provided with a joint, for example a film hinge, at the head end of the windshield wiper device. In particular, the clamping device can be connected to the wiper blade in such a manner that no further fastening tool is required. Consequently, a windshield wiper device according to the embodiments described here (for example FIGS. 1, 2A/B, 3A/B and 4) can be mounted without a tool.

The wiper-blade-side fastening part can contain a clamping jaw, which is provided rotatably at the head end, and a projection 242. During the mounting, the projection 242 can latch behind the widened head end 230 of the drive shaft 130. Clamping to at least one part of the drive shaft, for example to the widened head end, therefore takes place.

According to embodiments described here, the wiper-blade-side fastening part has a cavity which is of a size 120 which is larger than, for example, the diameter 20 of the widened head end. By this means, the wiper blade 2 can be brought without clamping into the position illustrated in FIG. 2A, that is to say can be pushed onto the drive shaft. For clamping purposes, the clamping device is brought into a second position which is illustrated in FIG. 2B. The wiper blade in FIGS. 2A and 2B serves here as a lever. The wiper blade is rotated, and therefore rotation is provided between the clamping jaw 240 and the wiper blade. The wiper blade 2 and the clamping jaw 240 rotate here relative to each other about the axis of rotation 244.

During the clamping, the projection 242 can latch behind the widened head end. By means of the clamping, the widened head end is provided in the cavity at the head end of the windshield wiper device in such a manner that a form-fitting connection and/or force-fitting connection is provided between the wiper-blade-side fastening part and the drive shaft. According to some embodiments, knurls 131 can be provided on the drive shaft 130 in order to be able to transmit a greater torque. The widened head end can be provided within the scope of a knurled cup. The knurled cup is understood here as meaning a cylinder with a knurl and a corresponding hollow cylinder with a knurl, i.e. a positive knurl with a mating negative knurl.

Figure 3A:
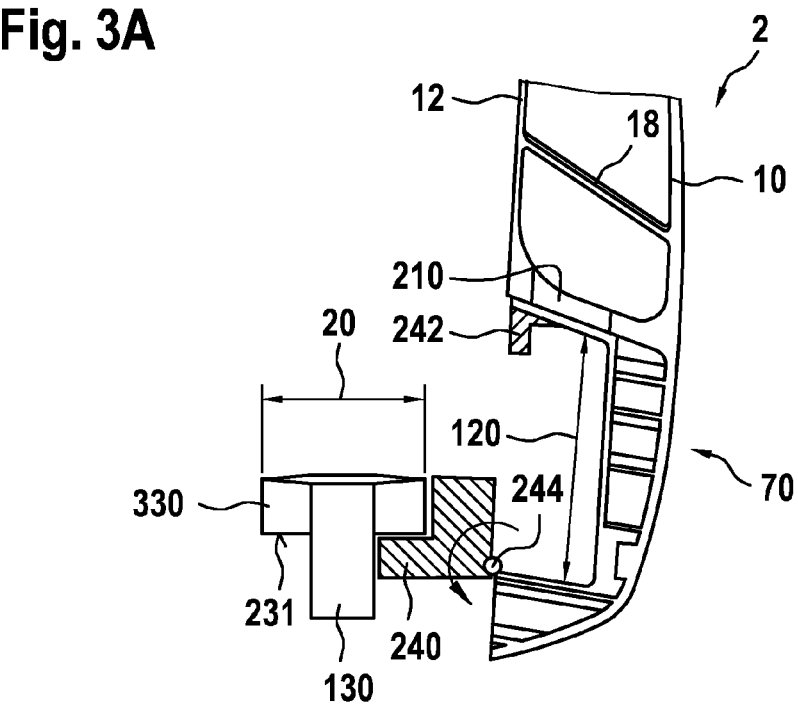
FIGS. 3A and 3B show a schematic illustration of a wiper blade with a clamping device according to embodiments of the invention in a first position, i.e. an open position, and a second position, i.e. a closed position.
Figure 3B:
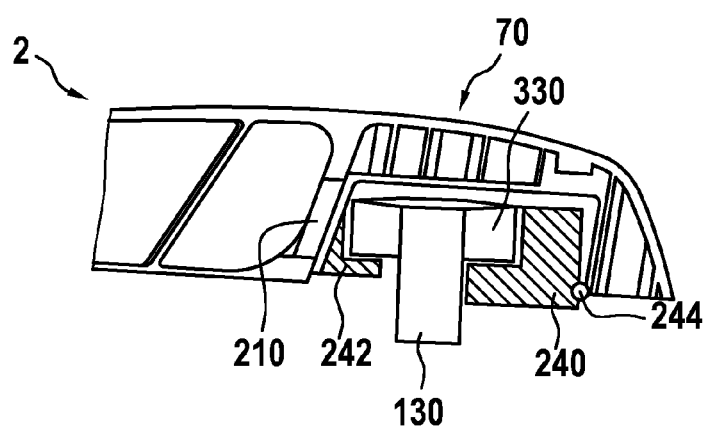

FIGS. 3A and 3B show a further refinement of a windshield wiper device according to embodiments described here. In contrast to FIGS. 2A and 2B, the widened head end of the drive shaft has a six-cornered cross section or is a hexagon. By this means, an unambiguous radial orientation of the windshield wiper device can be ensured. Secondly, a round cross section, for example with knurls, provides a better adjustment possibility of the radial orientation of the windshield wiper device. According to embodiments described here, the shape of the cross section of the widened head end can be selected from the group consisting of: round, round with knurls, 4-cornered, 6-cornered, 8-cornered, 12-cornered, torx-profile-shaped, and star-shaped.

Figure 4:
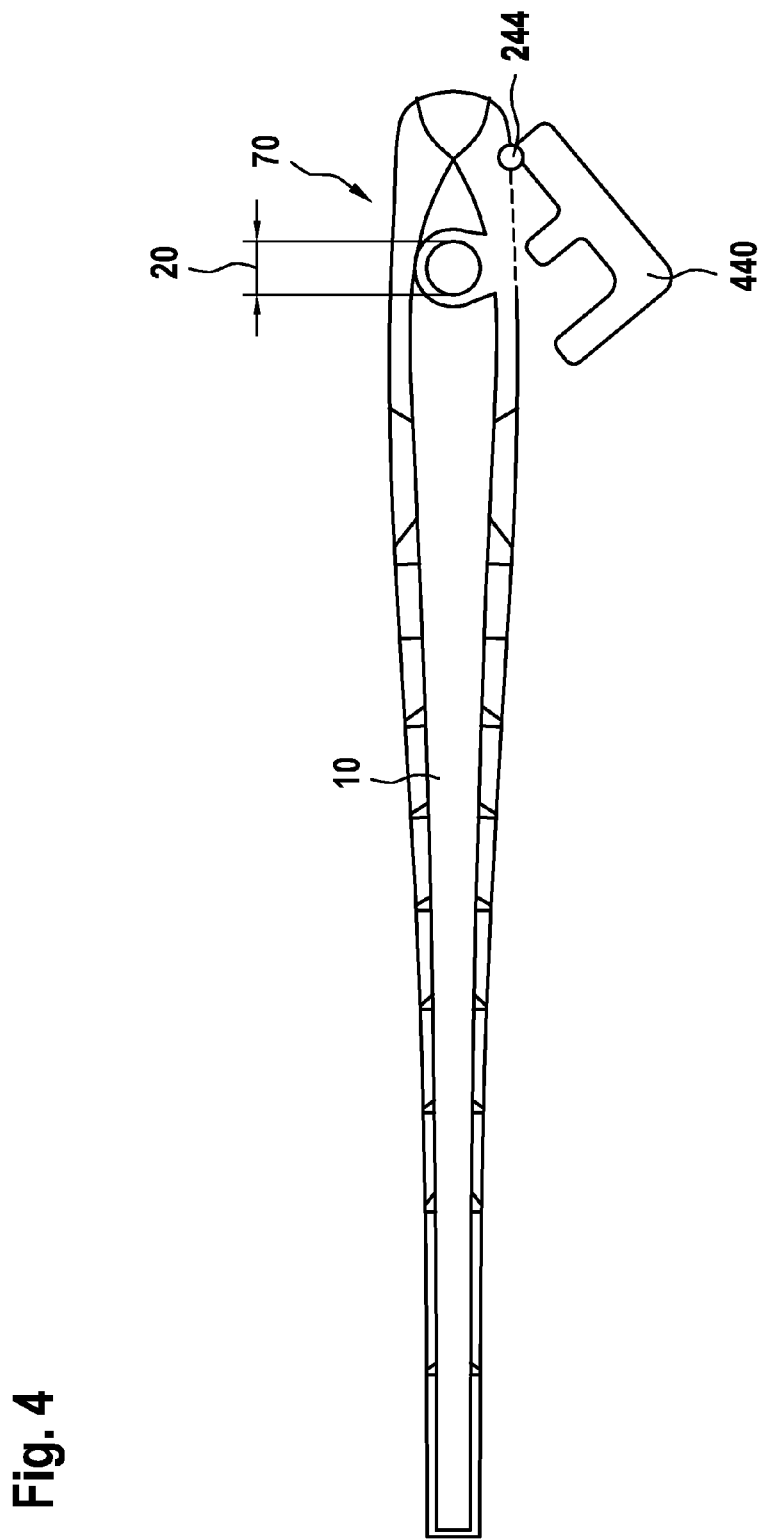
FIG. 4 shows a schematic illustration of a part of a wiper blade in a top view with a clamping device according to embodiments of the invention.

FIG. 4 shows a further embodiment of a windshield wiper device. The head end 70 or the wiper-blade-side fastening part are designed here in such a manner that the windshield wiper device can be pushed onto the drive shaft in the radial direction. The inside diameter of a cavity of the wiper-blade-side fastening part is larger than the outside diameter 20 of the drive shaft 130. There is a gap between the drive shaft and the wiper-blade-side fastening part 30. For the attachment of the wiper blade 2 or for the release of the wiper blade, a translatory movement takes place which can be oriented, for example, substantially radially with respect to the drive shaft 130. Tilting can be prevented by means of the gap. By actuation of the clamping device 440, a force-fitting connection and/or form-fitting connection can be provided between the wiper-blade-side fastening part and the drive shaft. The clamping device 440 is connected here to the head end 70 of the windshield wiper device by means of a joint 244. The clamping device 440 can be a clamping jaw which is provided with a joint 244, for example a film hinge, at the head end of the windshield wiper device. In particular, the clamping device can be connected to the wiper blade in such a manner that no further fastening tool is required.

Aspects of an exemplary windshield wiper device, for which the embodiments of the windshield wiper device that are described herein, in particular the described mounting or removal with a wiper-blade-side fastening part and a clamping device, are advantageous, are described below. The wiper arm or the wiper blade can be mounted in a particularly simple manner here and tilting during the mounting can be very substantially prevented. The tilting relates here to the fact that a wiper functioning according to the Finray principle already builds up the contact pressure for the wiping operation upon contact with the windshield and, as a result, a force is built up which, during the translatory mounting, substantially along the direction of the axis of the drive shaft, may lead to tilting.

Figure 5A:
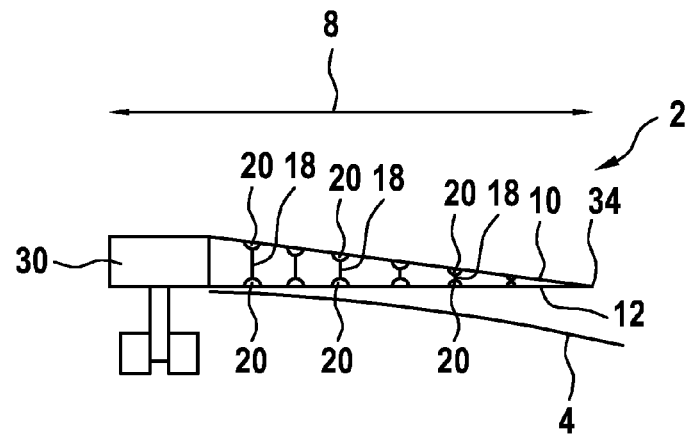
FIG. 5A shows a schematic illustration of a further exemplary embodiment of a windshield wiper device according to the invention in the form of a wiper arm with an integrated wiper blade in a basic position.
Figure 5B:
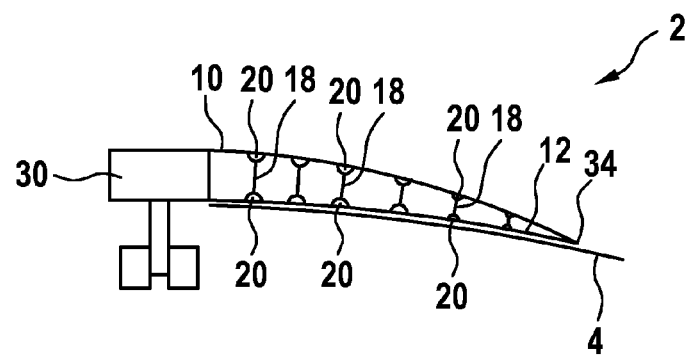
FIG. 5B shows a schematic illustration of the wiper arm with an integrated wiper blade according to FIG. 5A in a position placed against a windshield.

FIGS. 5A and 5B show schematic illustrations of a wiper blade 2 in a basic position and in a position placed against a windshield according to embodiments of the windshield wiper device of the disclosure. Finray wipers for which a compensating layer 13 according to embodiments described here is particularly useful are described. The compensating layer 13 is not illustrated again in FIGS. 5A, 5B, 6 and 7 and can also be provided in these embodiments, as previously described. The wiper blade 2 serves for wiping a windshield 4 of a vehicle which is, for example, a motor vehicle, in particular a car. The wiper blade 2 has a longitudinal extent 8 and has an elongate upper part 10 and a likewise elongate lower part 12. The longitudinal extents of the upper part 10 and of the lower part 12 substantially correspond to the longitudinal extent 8 of the wiper blade 2.

Both the upper part 10 and the lower part 12 are bendable beams or may be configured as bendable beams. It is likewise possible for in each case only one part of the upper part 10 and/or of the lower part 12 to be configured to be bendable. According to some embodiments that may be combined with other embodiments described here, a material that has a modulus of elasticity in a range between 0.005 kN/mm$^2$ and 0.5 kN/mm$^2$, in particular 0.01 kN/mm$^2$ and 0.1 kN/mm$^2$, is used for the upper part 10 and/or the lower part 12. This makes it possible to realize suitable bendability of the upper part 10 and of the lower part 12. Together with a suitably configured cross-sectional area of the upper part 10 and of the lower part 12, optimum flexural rigidity is thus attained.

The upper part 10 and the lower part 12 are fastened to a fastening part 30. The windshield wiper device can be connected to the vehicle by means of the fastening part 30, for example with a quick fix fastening. On the side which lies opposite the fastening part 30 along the longitudinal extent of the windshield wiper device, the upper part 10 and the lower part 12 are connected at a connecting position 34. The connecting elements are configured in such a manner that the distance of the connecting position with the upper part and the distance of the connecting position with the lower part changes by at maximum ±1 mm, in particular by at maximum ±0.3 mm (for example by thermal expansion and/or tension and compressive loading). The connecting elements can therefore be of substantially inelastic design or the effect of the connecting elements is based on the force transmission thereof between upper part and lower part and not on the elasticity thereof.

The upper part 10 and the lower part 12 are connected to each other by connecting elements 18. The connecting elements 18 are fastened to mutually facing inner longitudinal sides of the upper part 10 and of the lower part 12 by means of rotary joints 20. The rotary joints 20 are typically hinges. In particular, the rotary joints 20 may be in the form of film hinges. This is advantageous in particular if the upper part 10, the lower part 12 and/or the connecting elements 18 are produced from a plastics material or are coated with a suitable plastics material.

According to typical embodiments described here, which may be combined with other embodiments described here, a rotary joint is selected from the following group consisting of: a hinge, a film hinge, a narrowing of the material for the purpose of generating reduced rigidity along a torsional axis, a joint with an axis of rotation, a means for connecting the upper part to the connecting element or for connecting the lower part to the connecting element, which means permits the displacement of the lower part in relation to the upper part along the longitudinal extent, etc.

Embodiments in which the joints are provided by film hinges thus constitute a very simple way of providing the joints for a Finray wiper. The wiper blade 2 may be provided in one piece, in particular in ready-from-the-mold form. According to typical embodiments, the film hinges exhibit high ductility. This can be provided, for example, by means of a material selected from the group PP, PE, POM and PA. Alternatively, the film hinges may be produced from one or more materials from a group consisting of: TPE (Thermoplastic Elastomer), for example TPE-S, TPE-O, TPE-U, TPE-A, TPE-V and TPE-E.

The connecting elements 18 are spaced apart from one another along the longitudinal extent of the wiper blade 2. The spacings are advantageously less than 50 mm, in particular less than 30 mm. In this way, it is possible to ensure particularly great flexibility of the windshield wiper device, in particular of its lower part, and good adaptation to the curvature and changes in curvature of the windshield to be wiped.

FIG. 5B shows a schematic illustration of the wiper blade 2 according to FIG. 5A in a position placed against the windshield 4. Since the windshield 4 has a curvature, contact pressure forces act on the lower part 12 when the wiper blade 2 is placed against the windshield 4. Since the upper part 10 and the lower part 12 are bendable beams and the connecting elements 18 are mounted rotatably on upper part 10 and lower part 12, the upper part 10 and the lower part 12 are displaceable in relation to each other. By means of the compressive forces acting on the lower part 12 from below, the wiper blade 2 bends in the same direction from which the compressive forces come and is placed precisely against the curvature of the windshield 4.

By means of the construction of the embodiments described here, in the event of an action of force on the lower part (by means of the windshield 4), the lower part bends in the direction from which the force acts. This is provided by the connection of the upper part 10 and of the lower part to the connecting position 34, by the shape and by rotary joints at the connection between the connecting elements and the upper or lower part. A windshield wiper device according to embodiments described here uses the effect of tail fins of certain fish, which tail fins do not yield in the direction of pressure in the event of lateral pressure, but rather arch in the opposite direction, i.e. in the direction from which the pressure comes. This principle is also referred to as the fin ray principle. As a result, a windshield wiper device according to the embodiments described herein has the advantage of improved adaptation to a windshield of a motor vehicle. In the case of a conventional windshield wiper blade, the upper part thereof is customarily rigid, i.e. it is not of bendable design.

Figure 6:
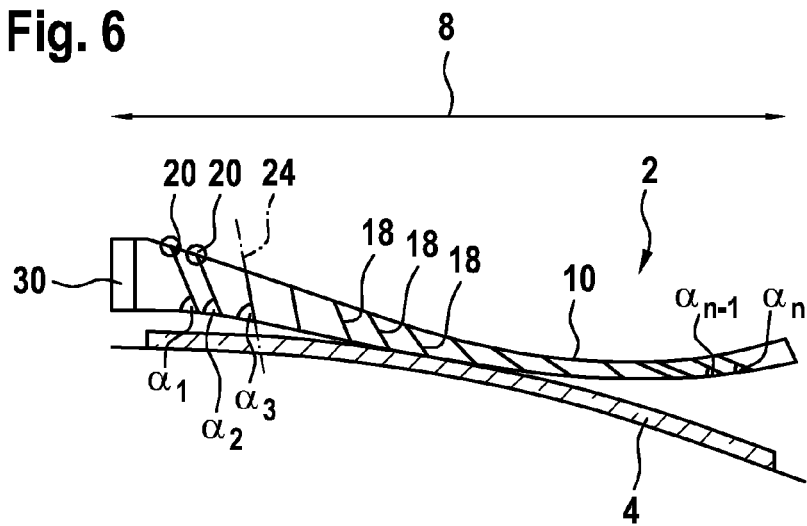
FIG. 6 shows a schematic illustration of a wiper blade according to embodiments of the present invention in a basic position.
Figure 7:
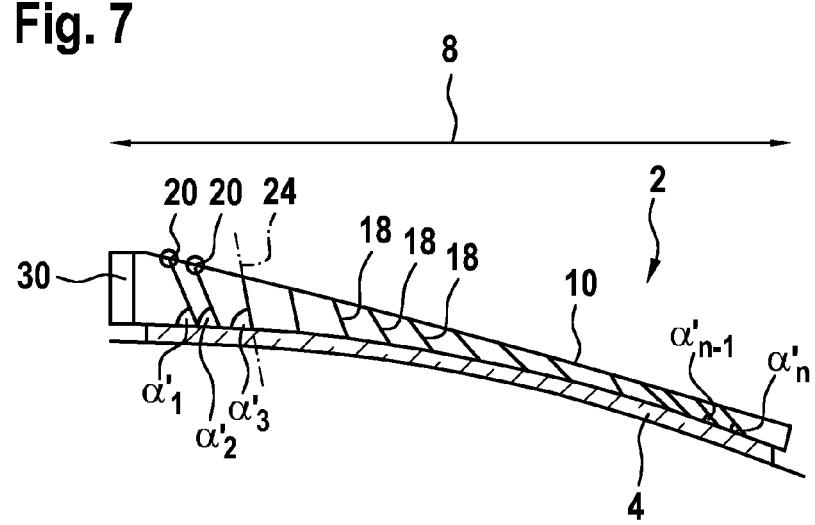
FIG. 7 shows a schematic illustration of a wiper blade according to embodiments of the present invention in a position placed against a windshield.

FIGS. 6 and 7 show schematic illustrations of a wiper blade 2 of a windshield wiper device for a vehicle, in particular for a motor vehicle, in a basic position (FIG. 6), i.e. in an unloaded state, and in a position placed against a windshield 4 (FIG. 7), according to the embodiments described herein. The wiper blade 2 comprises an elongate upper part 10 and an elongate lower part 12, which are configured to be at least partially bendable. Furthermore, a plurality of connecting elements 18 for connecting the upper part 10 and the lower part 12 are provided, wherein the connecting elements 18 are spaced apart from one another along a longitudinal extent 8 of the wiper blade 2. The connecting elements 18 are designed in order to permit a movement of the upper part 10 and of the lower part 12 relative to each other with a movement component along a longitudinal extent 8 of the wiper blade 2. Furthermore, the connecting elements 18 are arranged relative to the lower part 12 in such a manner that, in an unloaded state of the wiper blade 2, an angle $\alpha_n$ of the respective longitudinal axes 24 of the connecting elements 18 relative to the lower part 12 at least partially changes along a longitudinal extent 8 of the wiper blade 2, in particular changes continuously or changes monotonously or strictly monotonously.

In the wiper blade illustrated in FIG. 6 in the unloaded state, the angles $\alpha_n$ of the respective longitudinal axes of the connecting elements 18 relative to the lower part 12, which angles change along the longitudinal extent 8 of the wiper blade 2, are referred to by $\alpha_1, \alpha_2, \alpha_3, \ldots \alpha_{n-1}, \alpha_n$. In a loaded state of the wiper blade, i.e. in a position placed against the windshield, as is illustrated by way of example in FIG. 7, the angles $\alpha_n$ of the respective longitudinal axes 24 of the connecting elements 18 relative to the lower part 12 change in comparison to the unloaded state. In order to convey this, the angles $\alpha_n$ of the respective longitudinal axes of the connecting elements 18 relative to the lower part 12, which angles change along the longitudinal extent 8 of the wiper blade 2, are denoted in the wiper blade which is illustrated in FIG. 2 and which is in a position placed against the windshield by $\alpha'_1, \alpha'_2, \alpha'_3, \ldots \alpha'_{n-1}, \alpha'_n$.

According to embodiments of the windshield wiper device, which can be combined with other embodiments, the wiper blade 2 has at least one first region in which the angle $\alpha_n$ of the longitudinal axes 24 of the connecting elements 18 relative to the lower part 12 decreases along a longitudinal extent 8 of the wiper blade 2 toward a wiper blade end, in particular decreases monotonously, in particular strictly monotonously. Furthermore, the wiper blade 2 can have at least one second region in which the angle $\alpha_n$ of the longitudinal axes 24 of the connecting elements 18 relative to the lower part 12 increases along a longitudinal extent 8 of the wiper blade 2 toward a wiper blade end, in particular increases monotonously, in particular strictly monotonously. According to embodiments as illustrated by way of example in FIGS. 6 and 7, the second region of the wiper blade, in which the angle $\alpha_n$ of the longitudinal axes 24 of the connecting elements 18 relative to the lower part 12 increases along the longitudinal extent 8 of the wiper blade 2 toward a wiper blade end, is arranged at an inner position of the wiper blade that is located in the vicinity of a fastening device 30 of the wiper blade. This makes it possible to provide a windshield wiper device which permits particularly good adaptation to the curvature of a windshield. Furthermore, a substantially uniform contact pressure of the windshield wiper device against the windshield and also a homogeneous distribution of force over the windshield wiper device can be provided, and therefore a high wiping quality is provided.

According to embodiments of the wiper blade, which can be combined with other embodiments, the connecting elements 18, in particular in an unloaded state of the wiper blade 2, are fastened to the lower part 12 in such a manner that the longitudinal axes 24 of the connecting elements 18 run at angles $\alpha_n$ with respect to the lower part 12, which angles lie between a lower angle limit value $\alpha_{nu}$ and an upper limit value $\alpha_{no}$. According to embodiments, the lower angle limit value is $\alpha_{nu}=10°$, in particular $\alpha_{nu}=15°$, in particular $\alpha_{nu}=20°$, and the upper angle limit value is $\alpha_{no}=80°$, in particular $\alpha_{no}=90°$, in particular $\alpha_{no}=100°$. This advantageously ensures a particularly good transmission of a force, which acts on the lower part, to the upper part.

According to embodiments of the windshield wiper device, which may be combined with other embodiments, the connecting elements 18 are configured in such a manner that the spacing between the upper part 10 and the lower part 12 at least partially changes along a longitudinal extent 8 of the wiper blade 2, in particular continuously decreases in a first region and continuously increases in a second region. The spacing between the upper part 10 and the lower part 12 along the longitudinal extent 8 of the wiper blade 2 may also include a region in which the spacing between the upper part 10 and the lower part 12 along the longitudinal extent 8 of the wiper blade 2 is substantially constant. The spacing between the upper part 10 and the lower part 12 is greater on the fastening part than at the opposite end.

According to embodiments of the wiper blade, which may be combined with other embodiments, the inner spacing value (facing the fastening part) is at least 15 mm, in particular at least 25 mm, in particular at least 35 mm. According to embodiments which may be combined with other embodiments, the outer spacing value is at least 10 mm, in particular at least 12.5 mm, in particular at least 15 mm. According to embodiments which may be combined with other embodiments, the average spacing value is at least 7.5 mm, in particular at least 9 mm, in particular at least 12.5 mm.

As illustrated by way of example in FIGS. 6 to 7, the connecting elements 18 according to embodiments which may be combined with other embodiments are connected in an articulated manner to the lower part 12 and/or to the upper part 10. In particular, the connecting elements 18 are connected to the lower part 12 and/or to the upper part 10 by means of a first film hinge 20. The first film hinge 20 can be formed integrally with the connecting element 18 and the upper part 10 and/or the lower part 12. The integral configuration of the film hinges permits a simple and cost-effective production.

According to embodiments of the wiper blade, which may be combined with other embodiments described herein, the wiper blade comprises a first region with a first curvature $\omega<0$ and a second region with a second curvature $\omega>0$. Furthermore, the wiper blade according to embodiments may have a third region with a third curvature $\omega<0$, wherein the second region of the wiper blade is arranged with the second curvature $\omega>0$ between the first region with the first curvature $\omega<0$ and the third region with the third curvature $\omega<0$, as is shown by way of example in FIG. 6. A windshield wiper device can therefore be provided with which a substantially uniform contact pressure against the windshield 4 can be realized. Furthermore, a windshield wiper device can be provided which has improved adaptation to the windshield 4 and a high wiping quality.

According to further embodiments, in addition to a fastening closure which can be used for Finray wipers and in which the entire windshield wiper device is removed from a drive spindle on the vehicle, a mechanism can be provided in order to lift the wiper blade 2 of a windshield wiper device from the windshield 4 or to place said wiper blade onto the latter. This further simplifies the use, for example for manual cleaning of the windshield 4.

Figure 8:
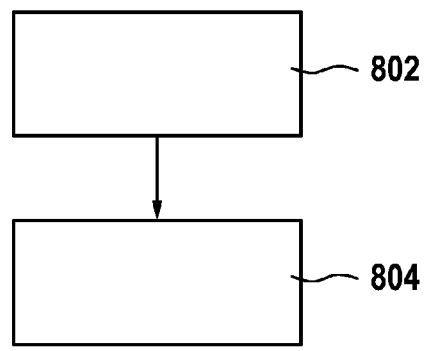
FIG. 8 shows a diagram for illustrating a method for mounting a windshield wiper device according to embodiments of the present invention.

A method for mounting a windshield wiper device according to embodiments described here is illustrated in FIG. 8. A wiper with a wiper-blade-side fastening part is provided and is pushed onto the drive shaft (see 802), wherein a gap is provided between the wiper-blade-side fastening part and the drive shaft. The wiper-blade-side fastening part is clamped with the clamping device to the drive shaft (see 804) in order to form a force-fitting connection and/or form-fitting connection between the wiper-blade-side fastening part and the drive shaft. In particular, a windshield wiper device which functions according to the Finray principle is involved.

What is claimed is:
1. A windshield wiper device (100) for a vehicle, the windshield wiper device comprising a drive shaft having a groove, the windshield wiper device further comprising a wiper blade (2) with an elongate upper part (10), which is configured to be at least partially bendable, an elongate lower part (12), which is configured to be at least partially bendable, a plurality of connecting elements (18) for connecting the upper part (10) and the lower part (12), wherein the connecting elements (18) are spaced apart from one another along a longitudinal extent (8) of the wiper blade (2), and wherein the connecting elements (18) are designed in order to permit a movement of the upper part (10) and of the lower part relative to each other with a movement component along the longitudinal extent (8) of the wiper blade (2), and a wiper-blade-side fastening part (30), wherein the wiper-blade-side fastening part includes a clamping device (140) configured to secure the wiper blade-side fastening part (30) to the drive shaft, wherein the wiper-blade-side fastening part (30) further includes a bulge (133) that is separate from the clamping device and is engaged in the groove of the drive shaft, wherein the clamping device includes a lever that is configured to rotate from a first position out of the groove and into a second position into the groove.

2. The windshield wiper device (100) as claimed in claim 1, wherein the wiper-blade-side fastening part comprises a cavity which, in a first position of the clamping device, has a larger cavity size than the at least one part of the drive shaft.

3. The windshield wiper device as claimed in claim 2, wherein the clamping device is movable into a second position in which a force-fitting connection and/or form-fitting connection can be releasably produced with the drive shaft.

4. The windshield wiper device as claimed in claim 2, wherein the cavity has a cylindrical portion which has a larger inside diameter than a corresponding outside diameter of the at least one part of the drive shaft.

5. The windshield wiper device (100) as claimed in claim 1, wherein the clamping device has a lever.

6. The windshield wiper device (100) as claimed in claim 1, wherein the clamping device is configured such that the wiper blade provides a lever action for the clamping device.

7. The windshield wiper device as claimed in claim 1, wherein the wiper-blade-side fastening part is formed in one piece or with components fastened to the head end of the wiper blade.

8. The windshield wiper device as claimed in claim 1, wherein the wiper-blade-side fastening part is injection molded.

9. The windshield wiper device as claimed in claim 1, wherein the clamping device is connected to the wiper blade with a connecting joint.

10. The windshield wiper device (100) as claimed in claim 1, wherein the plurality of connecting elements are connected at a plurality of upper connecting positions to the upper part and at a plurality of lower corresponding connecting positions to the lower part, and wherein, when the upper part and the lower part move relative to each other, the distance between an upper connecting position and a corresponding lower connecting position is substantially constant.

11. A method (200) for mounting a windshield wiper device, comprising:

providing (201) a windshield wiper device (100) as claimed in claim 1, pushing the wiper-blade-side fastening part (30) onto the drive shaft, wherein a gap is provided between the wiper-blade-side fastening part and the drive shaft;

inserting the bulge (133) into the groove of the drive shaft; and clamping the wiper-blade-side fastening part to the drive shaft with the clamping device in order to form a force-fitting connection and/or form-fitting connection between the wiper-blade-side fastening part and the drive shaft.

12. The method of claim 11, further comprising rotating a portion of a lever of the clamping device into the groove of the drive shaft.

13. The windshield wiper device as claimed in claim 1, wherein the wiper blade-side fastening part is injected molded in an injection molding process comprising one step.

14. The windshield wiper device (100) as claimed in claim 1, wherein the plurality of connecting elements are connected at a plurality of upper connecting positions to the upper part and at a plurality of lower corresponding connecting positions to the lower part, and wherein, when the upper part and the lower part move relative to each other, the distance between an upper connecting position and a corresponding lower connecting position is constant with a deviation of ±1 mm.

15. The windshield wiper device (100) as claimed in claim 1, wherein the wiper-blade-side fastening part (30) includes a main body having a first elongate cavity sized and shaped to receive the drive shaft, and wherein the main body further includes a second elongate cavity, wherein the lever is partially disposed within the second cavity.

16. The windshield wiper device (100) as claimed in claim 15, wherein the first elongate cavity and the second elongate cavity are angled relative to one another at an oblique angle.

17. The windshield wiper device (100) as claimed in claim 16, wherein the wiper blade (2) defines an opening, and wherein the lever extends through both the opening of the wiper blade (2) as well as the second elongate cavity of the main body.

18. The windshield wiper device (100) as claimed in claim 1, wherein the lever is configured to rotate about an axis (142) that is disposed adjacent the groove.

19. The windshield wiper device (100) as claimed in claim 1, wherein the lever is an elongate member having a first end and a second, opposite end, wherein the lever is configured to pivot about the second end, and wherein the first end is disposed within an interior cavity of the wiper blade (2).

* * * * *